(12) United States Patent
Hool et al.

(10) Patent No.: US 7,093,911 B2
(45) Date of Patent: Aug. 22, 2006

(54) FLOATING PISTON FOR AUGMENTING PRESSURIZED FLUID FLOW DURING VEHICLE BRAKING OPERATIONS

(75) Inventors: Patrick H. Hool, Saint Clair, MI (US); Gamil M. Rizk, Canton, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/766,080

(22) Filed: Jan. 28, 2004

(65) Prior Publication Data

US 2005/0162005 A1 Jul. 28, 2005

(51) Int. Cl.
*B60T 8/34* (2006.01)

(52) U.S. Cl. .............. 303/113.5; 303/9.63; 303/9.75; 303/113.1

(58) Field of Classification Search .............. 303/116.4, 303/61, 113.5, 186, 187, 113.1, 9.62, 9.63, 303/9.75
See application file for complete search history.

(56) References Cited

U.S. PATENT DOCUMENTS 4,161,105 A    7/1979  Hagiwara
4,989,924 A *  2/1991  Toda et al. .............. 303/113.1
5,567,022 A   10/1996  Linkner, Jr. .............. 328/113.5
5,673,978 A   10/1997  Linkner, Jr.
5,890,364 A    4/1999  Linkner, Jr. et al.
6,231,132 B1 * 5/2001  Watanabe ................ 303/116.2

* cited by examiner

*Primary Examiner*—James McClellan
*Assistant Examiner*—Mariano Sy
(74) *Attorney, Agent, or Firm*—MacMillan, Sobanski & Todd, LLC (57) ABSTRACT

A hydraulic braking system including first and second braking circuits. The first and second braking circuits each include a wheel brake, a pressurized fluid source, and a hydraulic conduit connecting the wheel brake to the fluid source. Each of the hydraulic conduits includes a control valve that operates to selectively prevent fluid flow from the pressurized fluid source to the wheel brake. A connecting conduit connects the first and second braking circuits. A floating piston is disposed within the connecting conduit and is adapted to be displaced by the pressurized fluid provided by the pressurized fluid source in the first braking circuit when the control valve of the first braking circuit is closed. The displacement of the piston generates an additional volume of pressurized fluid in the hydraulic conduit of the second braking circuit that effectively augments the pressurized fluid provided by the second pressurized fluid source.

7 Claims, 4 Drawing Sheets

FLOATING PISTON FOR AUGMENTING PRESSURIZED FLUID FLOW DURING VEHICLE BRAKING OPERATIONS

TECHNICAL FIELD OF THE INVENTION

This invention relates in general to a vehicle braking system. In particular, this invention relates to a hydraulic braking system that integrates a floating piston into the system that operates to augment the pressurized fluid supplied to individual wheel brakes during vehicle braking operations.

BACKGROUND OF THE INVENTION

The ability to independently control the braking force at each of the vehicle's wheels enables operation of a vehicle brake system in various special modes of operation. One of these special modes of operation is traction control. During vehicle acceleration, a vehicle wheel may lose traction, and begin to spin. In the traction control mode of braking, the brake system is electronically actuated, without the driver stepping on the vehicle brake pedal, to individually brake the spinning wheel. When the wheel has slowed sufficiently to regain traction, the brake is released.

Another of these special modes of operation is vehicle stability control. Vehicle stability control systems use sensor inputs to calculate the driver's desired path and the vehicle's actual path. If there is a difference between the desired and actual paths, the brake system can be operated to correct vehicle direction by automatically applying/releasing individual wheel brakes.

In a typical braking system having an integrated traction control system and vehicle stability control capabilities, several braking circuits are provided to control the individual wheel brakes of the vehicle. Generally, two braking circuits are provided, with each circuit controlling the operation of two wheel brakes of the vehicle. While the configuration of the individual circuits may vary, each braking circuit typically includes isolation and supply solenoid valves that are used to either restrict or facilitate fluid flow from a shared master cylinder through an individual brake solenoid valve to apply fluid pressure to actuate each individual wheel brake within the braking circuit. A dump solenoid valve is generally also provided in conjunction with each individual brake solenoid valve to release the pressurized fluid from the individual wheel brakes and to allow the pressurized fluid to flow to an accumulator. A pressurized fluid source, such as a pump or high pressure accumulator, is generally located in each braking circuit to pump the fluid back through the system. Therefore, multiple pressurized fluid sources are used within the braking system, as a pressurized fluid source is provided within each individual braking circuit to control the fluid flow therein. The individual braking circuits may also include other fluid flow devices, such as attenuators, check valves, and/or restricted orifices, depending upon the system design.

It is known from the prior art to cross-connect the individual braking circuits to allow certain individual components present in each of the braking circuits to work in conjunction with the companion component in the other braking system. For example, U.S. Pat. No. 5,567,022 to Linkner, Jr. discloses an anti-lock braking system that cross connects the individual braking circuits using an elastomeric element to attenuate the pressure pulse energy dissipation provided by each of the attenuators in the individual braking circuits. The cross-connection of the braking circuits via the elastomeric element allows the attenuator action from one individual braking circuit to complement the attenuator action of the other individual braking circuit, which doubles the attenuator effectiveness and reduces noise within the anti-lock braking system. It is also known from the prior art to provide connection devices within a braking system to maintain fluid pressure balances within the braking system. For example, U.S. Pat. No. 5,890,364 to Linkner, Jr. et al. discloses a compensation piston arrangement that balances the fluid pressure in a dual chamber master cylinder that is divided such that each of the individual fluid chambers within the master cylinder provides fluid to an individual braking circuit within a vehicle braking system. The compensation piston operates to maintain generally equal fluid pressures within the master cylinder fluid chambers to compensate for minor normal differences between brake circuit fluid displacement.

Where each of the braking circuits are connected to a single chambered master cylinder, fluid is provided to each of the individual braking circuits from the master cylinder whenever operation of any of the individual wheel brakes in either braking circuit is required. This causes fluid to flow through each of the braking circuits, which in turn causes the pressurized fluid source in each of the braking circuits to operate to supply fluid pressure within the circuit. During certain braking operations, such as traction control or vehicle stability control operations, the control mechanisms of each braking circuit, i.e. the supply and isolation valves, allow fluid to flow to only one of the individual wheel brakes, which results generally in the utilization of only one of the individual braking circuits. Therefore, the output of the pressurized fluid source in the non-utilized braking circuit is not used, meaning the output of the pressurized fluid source does not supply fluid pressure to the wheel brakes within the braking circuit, and the pressurized fluid source operates only to supply fluid back to the master cylinder fluid reservoir.

SUMMARY OF THE INVENTION

Although it is known to cross-connect certain elements within the individual braking circuits or provide pressure balancing mechanisms between the individual braking circuits, cross-connection of certain other elements within typical braking systems has hitherto been unknown in the art. According to the invention, it has now been recognized that it would be desirable to develop a system that connects the individual braking circuits within the braking system to utilize the pressurized fluid output of both individual braking circuits to augment the fluid pressure applied to an individual wheel brake during vehicle braking operations.

The invention relates to a hydraulic braking system for a wheeled vehicle including a floating piston within the braking system. The floating piston operates to augment the pressurized fluid supplied to individual wheel brakes during vehicle braking operations. The braking system is comprised of multiple braking circuits, namely a first braking circuit and a second braking circuit. The first braking circuit generally includes at least a first wheel brake, a first source of pressurized fluid, and a first hydraulic conduit connecting the first wheel brake to the first source of pressurized fluid. The first hydraulic conduit connecting the first wheel brake and the first source of pressurized fluid generally has a first control valve disposed therein, the first control valve operating to selectively prevent fluid flow from the first source of pressurized fluid to the first wheel brake.

The second braking circuit is structured similar to the first braking circuit, generally including at least a second wheel brake, a second source of pressurized fluid, and a second hydraulic conduit connecting the second wheel brake to the second source of pressurized fluid. The second hydraulic conduit connecting the second wheel brake and the second source of pressurized fluid generally has a second control valve disposed therein, the second control valve operating to selectively prevent fluid flow from the second source of pressurized fluid to the second wheel brake.

A connecting conduit connects the first braking circuit and the second braking circuit. The connecting conduit has a piston assembly disposed therein, which includes a cylindrical housing with a floating piston disposed within the cylindrical housing. The floating piston is adapted to be displaced by the pressurized fluid provided by the first source of pressurized fluid when the first hydraulic conduit of the first braking circuit is closed. The displacement of the floating piston subsequently generates an additional volume of pressurized fluid in the second hydraulic conduit of the second braking circuit. The additional volume of pressurized fluid in the second hydraulic conduit effectively augments the pressurized fluid provided by the second source of pressurized fluid in the second braking circuit, improving the response rate in achieving a desired braking pressure at the second wheel brake.

In an alternate embodiment of the invention, the braking system may also includes an additional valve disposed within the connecting conduit. The valve is located between the first braking circuit and the floating piston and operates to selectively prevent fluid flow into the connecting conduit and subsequently into the second braking circuit.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
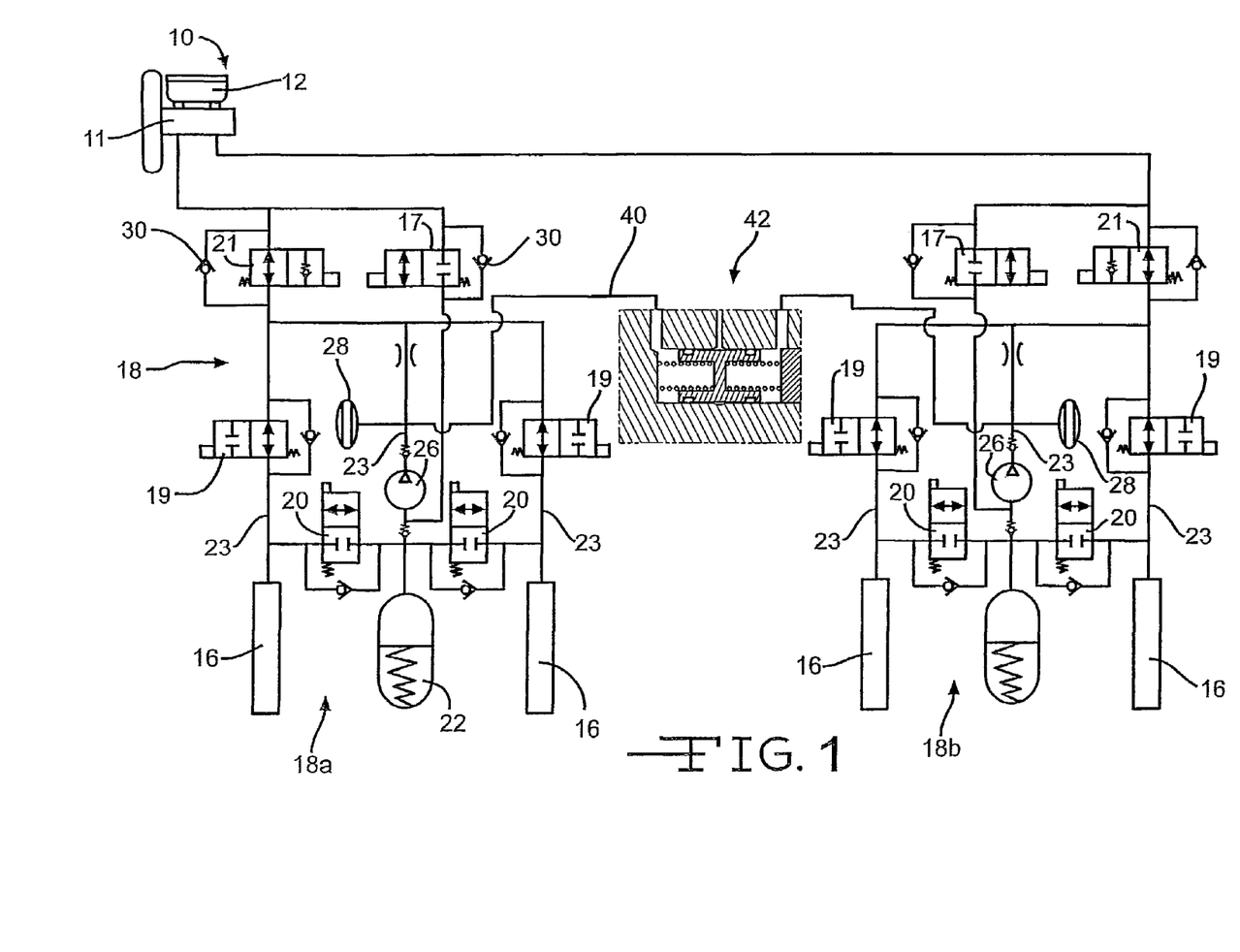
FIG. 1 is a schematic diagram illustrating the hydraulic braking system of the present invention including a floating piston.

Referring now to the drawings, there is illustrated in FIG. 1 a vehicular brake system, indicated generally at 10, incorporating the floating piston of the present invention. System 10 includes valves and other components described below to provide traction control and vehicle stability control functions. Although this invention will be described in the context of the illustrated braking system 10, it will be appreciated that the floating piston of this invention may be integrated into a variety of braking systems having configurations other than that illustrated and described herein. Examples of such alternate systems include, but are not limited to, electronic brake management systems or electro-hydraulic braking (EHB) systems.

The brake system 10 includes a brake pedal (not shown) connected to a master cylinder 11, having a fluid reservoir 12, for providing pressurized brake fluid to a plurality of wheel brakes 16. The wheel brakes 16 may be of any suitable type found on vehicles, such as drum brakes or disc brakes.

The brake system 10 also includes a hydraulic control unit (HCU), indicated generally at 18, which is connected in fluid communication between the master cylinder 11 and each wheel brake 16. The HCU 18 generally includes a plurality of braking circuits, with each braking circuit being responsible for controlling a predetermined number of the individual wheel brakes 16 of the vehicle. In a typical braking system, generally a first braking circuit and a second braking circuit, indicated generally at 18a and 18b, respectively, are provided. The first and second braking circuits 18a and 18b each generally provide the braking force for two of the individual wheel brakes 16. It will be appreciated, however, that any suitable number of braking circuits may be provided for controlling the braking functions of the vehicle and that the individual braking circuits 18a and 18b can control any number of individual wheel brakes 16 depending upon the configuration of the vehicle braking system. The configuration of the first and second braking circuit 18a and 18b is generally the same. It will be appreciated, however, that the design of the first braking circuit 18a and the second braking circuit 18b may differ from one another as well as from the general construction described herein.

Both the first braking circuit 18a and the second braking circuit 18b are generally comprised of a network of fluid conduits 23 to connect the components within each circuit 18a or 18b to one another as well as to the shared components of the braking system, such as the master cylinder 11. A number of valves are generally disposed within these fluid conduits 23 to selectively enable or restrict fluid flow through the conduits 23. Typically, each braking circuit 18a and 18b includes a supply valve 17 that allows fluid flow from the master cylinder 11 to the respective wheel brakes 16 of the braking circuit 18a or 18b. To control each wheel brake 16 during braking operations, an isolation valve 19 and a dump valve 20 is provided in each of the hydraulic conduits 23 providing a fluid channel to each of the individual wheel brakes 16. The isolation valve 19 and the dump valve 20 are used to provide or restrict fluid flow to each wheel brake 16, which causes the pulsating application of an individual wheel brake 16 within the braking circuit 18a or 18b. Additional isolation and dump valves may also be provided to allow fluid flow to the wheel brakes 16 when used in conjunction with other vehicle control systems, although such is not required. For example, the illustrated brake system 10 includes a traction control isolation valve 21 in each braking circuit 18a and 18b that allows fluid flow from the master cylinder 11 to the individual wheel brakes 16 of the first braking circuit 18a or the second braking circuit 18b as required in conjunction with traction control operations.

The dump valves 20 for the individual wheel brakes 16 allow fluid flow from the associated wheel brake 16 to at least one low pressure accumulator 22. Generally, both the first braking circuit 18a and the second braking circuit 18b include at least one low pressure accumulator 22 to receive fluid from the individual wheel brakes 16 associated with the respective braking circuit 18a or 18b. Each dump valve 20 is generally disposed between the associated wheel brake 16 and the low pressure accumulator 22 within the braking circuit 18*a* or 18*b*, and each dump valve 20 is normally a closed control valve. The isolation valves 19 and dump valves 20 are preferably formed as solenoid valves switchable between an open, flow prohibiting position, and a closed, flow enabling position, although it will be appreciated that any suitable control valve may be used.

Both the first braking circuit 18*a* and the second braking circuit 18*b* generally also include a hydraulic pump 26. Typically, the two hydraulic pumps 26 are driven by a single electric motor (not shown). Furthermore, the two hydraulic pumps 26 are typically embodied as piston pumps displaced on opposite sides of a camshaft, with the piston pumps 26 being alternately actuated by the camshaft (not shown) as the electric motor rotates the camshaft. Thus the pressure pulses in the first brake circuit 18*a* are typically 180 degrees out of phase with the pressure pulses in the second braking circuit 18*b*.

The hydraulic pump 26 in each circuit 18*a* or 18*b* is used to transfer fluid from the low pressure accumulator 22 within the braking circuit 18*a* or 18*b* back through the braking circuit 18*a* or 18*b* to provide fluid pressure to the wheel brakes 16 included within the individual braking circuit 18*a* or 18*b* when the hydraulic conduit 23 associated with an individual wheel brake 16 within the braking circuit 18*a* or 18*b* has an open flow path. The flow path is determined by the status of the control valves 19 and 20 within the braking circuit 18*a* or 18*b*, which are generally electrically connected to and controlled by an electronic control module (not illustrated). Alternatively, when the hydraulic conduits 23 supplying fluid pressure to the wheel brakes 16 within either the first braking circuit 18*a* or the second braking circuit 18*b* are closed, such as during traction control or vehicle stability control operations where only a single individual wheel brake 16 is applied, the fluid pressure supplied by the hydraulic pump 26 in the closed circuit 18*a* or 18*b* allows fluid to flow from the low pressure accumulator 22 back to the master cylinder reservoir 12. Therefore, where the first braking circuit 18*a* or the second braking circuit 18*b* is unutilized, i.e. the hydraulic conduits 23 supplying fluid pressure to the individual wheel brakes 16 within the braking circuit 18*a* or 18*b* are closed, the fluid pressure supplied by the hydraulic pump 26 associated with the unutilized braking circuit 18*a* or 18*b* is essentially wasted because the fluid pressure generated by the hydraulic pump 26 is used only to return the pressurized fluid to the master cylinder reservoir 12 and not to control vehicle braking operations within the braking system 10.

The wheel brake circuits 18*a* and 18*b* of the HCU 18 may also include other fluid flow devices, such as an attenuator 28, check valves 30 to regulate the direction of fluid flow, and/or restricted orifices 32 to regulate fluid flow, depending upon the system design.

In order to maximize the fluid pressure within either the first braking circuit 18*a* or second braking circuit 18*b* during vehicle braking operations where only a single vehicle braking circuit 18*a* or 18*b* is utilized, such as during traction control or vehicle stability control operations, a connecting conduit 40 is disposed between the first braking circuit 18*a* and the second braking circuit 18*b*. The connecting conduit 40 provides a fluid connection between the first braking circuit 18*a* and the second braking circuit 18*b* that allows pressurized fluid from an unutilized braking circuit 18*a* or 18*b*, i.e. a braking circuit not providing fluid pressure to the individual wheel brakes 16 within the braking circuit 18*a* or 18*b*, to augment the pressurized fluid in the utilized braking circuit 18*a* or 18*b*. The connecting conduit 40 can connect the first braking circuit 18*a* and the second braking circuit 18*b* at any suitable location that provides access to the pressurized fluid output of the pressurized fluid source within each braking circuit 18*a* and 18*b*. In the illustrated embodiment, the connecting conduit 40 connects the hydraulic conduit 23 disposed at the output side of the hydraulic pump 26 in the first braking circuit 18*a* with the hydraulic conduit 23 disposed at the output side of the hydraulic pump 26 of the second braking circuit 18*b*.

Figure 2:
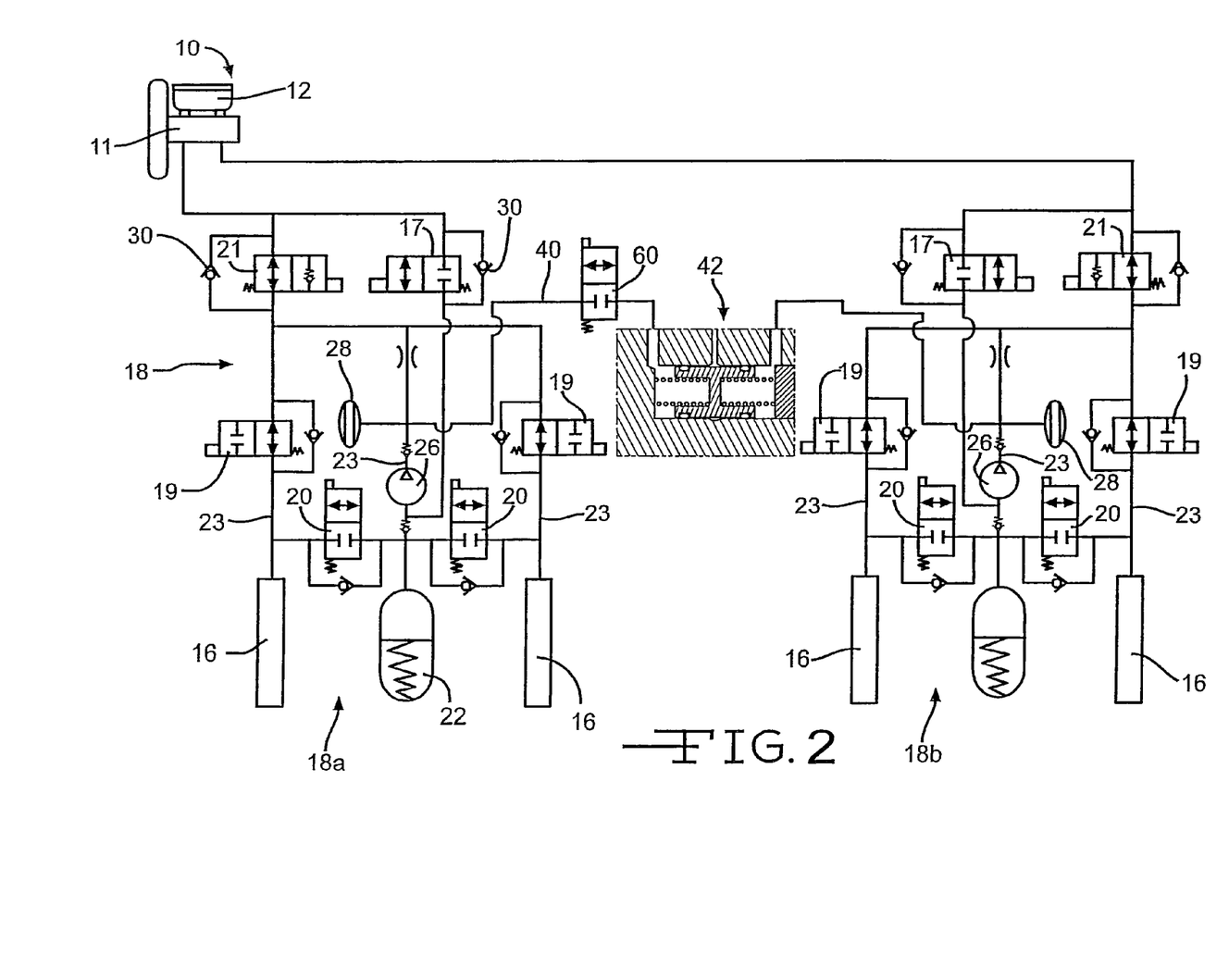
FIG. 2 is a schematic diagram illustrating the hydraulic braking system of the present invention including a floating piston and a valve for operating the floating piston within the braking system.

In an alternate embodiment of the invention, shown in FIG. 2, a valve 60 may be included within the connecting conduit 40. The valve 60 is used to selectively prevent fluid flow in the connecting conduit 40. The valve 60 can be disposed at any suitable location within the connecting conduit 40, and is preferably located between the first braking circuit 18*a* and a piston assembly 42. The piston assembly 42 will be discussed in greater detail below. The valve 60 can be any suitable control valve that operates to restrict fluid flow through the connecting conduit 40, and is preferably formed as a normally open solenoid valve switchable between an open, flow prohibiting position, and a closed, flow enabling position.

Figure 3:
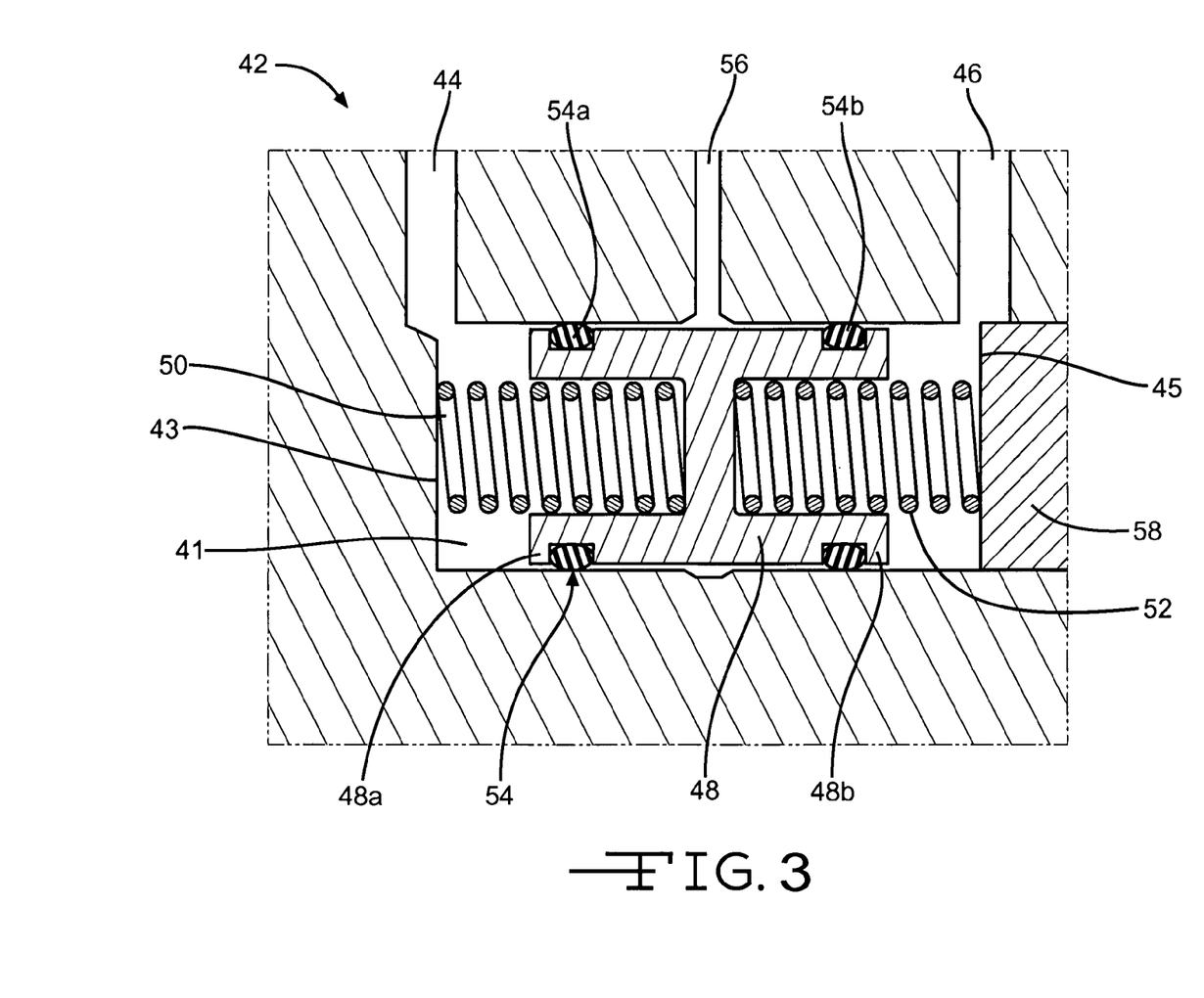
FIG. 3 is a cross-sectional view of the floating piston of the present invention in the neutral position.
Figure 4:
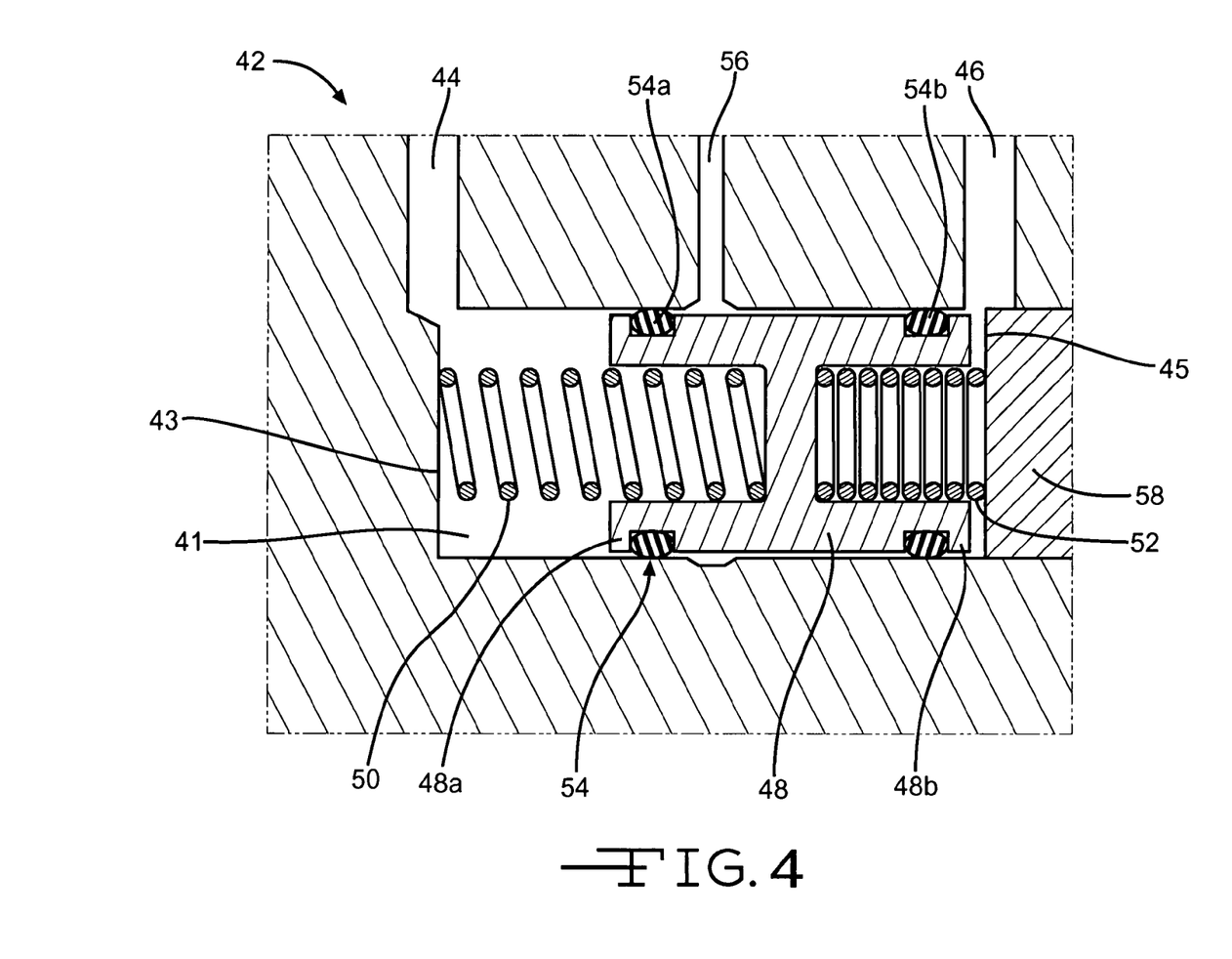
FIG. 4 is a cross-sectional view of the floating piston of the present invention illustrating a maximum displacement position of the floating piston.

A piston assembly 42 is disposed within the connecting conduit 40 to limit the amount of volumetric fluid flow that is transmitted through the connecting conduit 40, as will be described below. As shown in FIGS. 3 and 4, the piston assembly 42 is generally comprised of a cylindrical housing 41 having a floating piston 48 disposed therein. The cylindrical housing 41 has a first end 43 having a first opening 44 to receive pressurized fluid from the pressurized fluid source of the first braking circuit 18*a* and a second end 45 having a second opening 46 to receive pressurized fluid from the pressurized fluid source of the second braking circuit 18*b*. The cylindrical housing 41 also includes a plug 58 at one end thereof for sealing the cylindrical housing 41. The plug 58 may be of any suitable size and shape and may be constructed from any suitable material to seal the cylindrical housing 41 of the piston assembly 42.

The floating piston 48 is disposed within the cylindrical housing 41, having a first end 48*a* disposed most adjacent the first end 43 of the cylindrical housing 41 and a second end 48*b* disposed most adjacent the second end 45 of the cylindrical housing 41. The floating piston 48 may be of any suitable shape, and is preferably sized to have a diameter that is only slightly smaller than the diameter of the cylindrical housing 41. The floating piston 48 is held within the cylindrical housing 41 using two springs 50 and 52. The first spring 50 is located between the first end 43 of the cylindrical housing 41 and the first end 48*a* of the floating piston 48, and the second spring 52 is located at the between the second end 45 of the cylindrical housing 41 and the second end 48*b* of the floating piston 48. The springs 50 and 52 hold the piston 48 in a neutral position, which is preferably located at the midpoint of the cylindrical housing 41. A series of sealing rings, indicated generally at 54, are disposed about the floating piston 48 to provide an impermeable seal between the piston 48 and the cylindrical housing 41, with a first sealing ring 54*a* being disposed about the first end 48*a* of the floating piston 48 and a second sealing ring 54*b* being disposed about the second end 48*b* of the floating piston 48. It will be appreciated that additional sealing rings 54 may also be included, although such is not required. The sealing rings 54 are generally annular in shape and are disposed about the outer surface of the floating piston 48. The sealing rings 54 may be made of any suitable material, and are preferably made from an elastomeric material. The cylindrical housing 41 also includes a vent opening 56 located between the first and second sealing rings 54*a* and 54b disposed about the piston 48. The function of the vent opening 56 will be described in detail below.

In order to operate to augment the fluid pressure within the individual braking circuits 18a and 18b, the floating piston 48 is capable of reciprocal motion within the cylindrical housing 41. The floating piston 48 is displaced when the fluid pressure at one end of the piston 48 exceeds the fluid pressure at the other end of the piston 48, causing the spring 52 disposed at the end of the piston 48 having lower pressure to be compressed, as illustrated in FIG. 4. Preferably, displacement of the first seal 54a of the floating piston 48 during reciprocal motion is limited to the area between the first end 48a of the piston 48 and the vent opening 56. Similarly, displacement of the second seal 54b is limited to the area between the second end 48b of the piston 48 and the vent opening 56. The limitation of the displacement of the piston 48 between the sealing rings 54 and the vent opening 56 limits the amount of volumetric fluid flow through the piston 48 during operation and will be explained in greater detail below.

During certain braking operations, the HCU 18 allows fluid to flow to only one of the individual wheel brakes 16, meaning that only one wheel brake circuit 18a or 18b is utilized. One such mode of operation is traction control. During traction control, the brake system 10 is electronically actuated, without the driver stepping on the vehicle brake pedal, to individually brake the spinning wheel. When the HCU 18 detects a spinning wheel, traction control is initiated by opening the supply valves 17 and the traction control isolation valves 21 in both the first braking circuit 18a and the second braking circuit 18b, as well by activating the individual wheel brake 16 isolation valves 19 for the three non-spinning wheels of the vehicle. The opening of the various control and isolation valves 17, 19, and 21 restricts fluid flow through the corresponding hydraulic conduits 23 within the braking circuits 18a and 18b. However, regardless of the flow status of the various hydraulic conduits 23 dictated by the isolation and control valves 17, 19, and 21, fluid is provided from the master cylinder 11 to each braking circuit 18a and 18b during traction control operations. Because the fluid provided from the master cylinder 11 is not used to provide fluid pressure to either wheel brake 16 in one of the braking circuits 18a or 18b, as the fluid path to three of the four wheel brakes 16 is closed, the fluid provided to the unutilized braking circuit 18a or 18b flows from the master cylinder 11 to the hydraulic pump 26. In existing braking systems, the hydraulic pump 26 of the unutilized braking circuit 18a or 18b would then pump pressurized fluid back to the master cylinder reservoir 12, as the fluid is not required for braking operation of the unutilized braking circuit 18a or 18b.

According to the present invention, however, a volume of the pressurized fluid provided by the pump 26 of the unutilized braking circuit 18a or 18b flows into the connecting conduit 40. The pressurized fluid from the unutilized braking circuit 18a or 18b flows through the connecting conduit 40 until it encounters the piston assembly 42 of the present invention. In the alternate embodiment of the invention, illustrated in FIG. 2, where the valve 60 is disposed between the first braking circuit 18a and the piston assembly 42, the valve 60 would be positioned so as to provide an open flow path, thus allowing the pressurized fluid to flow through the connecting conduit 40 and the piston assembly 42. The fluid enters the cylindrical housing 41 of the piston assembly 42 through the fluid inlet 44 or 46 located adjacent to the unutilized braking circuit 18a or 18b. This causes the pressure within the cylindrical housing 41 on either side of the floating piston 48 to become unbalanced, as the pressurized fluid provided from the master cylinder 11 to the utilized braking circuit 18a or 18b has been diverted to provide fluid pressure to the wheel brake 16 within the utilized braking circuit 18a or 18b having an open flow channel (resulting from the non-activated isolation valve 19 in the hydraulic conduit 23 associated with the individual wheel brake 16). Because the fluid pressure on the side of the floating piston 48 associated with the unutilized braking circuit 18a or 18b is greater than the fluid pressure on the side of the floating piston 48 associated with the utilized braking circuit 18a or 18b, the piston 48 is displaced from the neutral position toward the utilized braking circuit 18a or 18b, which subsequently compresses the spring 50 or 52 located in the portion of the cylindrical housing 41 adjacent to the utilized braking circuit 18a or 18b. The displacement of the piston 48 causes a corresponding amount of fluid to flow into the utilized braking circuit 18a or 18b, with a commensurate increase in fluid pressure of the fluid located in the portion of the connecting conduit 40 in fluid connection with the utilized braking circuit 18a or 18b. This fluid volume and fluid pressure increase is subsequently transmitted through the connecting conduit 40 and into the hydraulic conduit 23 having an open flow channel in the utilized braking circuit 18a or 18b. The additional fluid volume and fluid pressure augments the pressurized fluid within the utilized braking circuit 18a or 18b to provide a faster increase in braking force to brake the spinning wheel. While it will be appreciated that the impact of the displacement of the piston 48 may vary with respect to the magnitude of the piston 48 displacement, in one modeled embodiment of the vehicular braking system 10, the pressure rising rate in the wheel brake cylinder 16 receiving the augmented fluid pressure in the utilized braking circuit 18a or 18b has been shown to increase from approximately 277.5 bar per second in a braking system not incorporating the connecting conduit 40 and the piston assembly 42 of the present invention, to approximately 425 bar per second when utilizing the connecting conduit 40 and the piston assembly 42 of the braking system 10 of the present invention.

Another benefit of the piston assembly 42 is that the pressure pulsations in the first braking circuit 18a and the second braking circuit 18b are evened out, which reduces the amount of noise in the braking system 10. As previously discussed, the pressure pulses of the hydraulic pump 26 in the first brake circuit 18a are typically 180 degrees out of phase with the pressure pulses of the hydraulic pump 26 in the second braking circuit 18b. This phase differential is due to the alternating actuation of the piston pumps 26, which are located at opposite ends of the camshaft, as the electric motor rotates the camshaft. Because the piston assembly 42 shares the pump pulse of hydraulic pump 26 in the first braking circuit 18a with the pump pulse of the hydraulic pump 26 in the second braking circuit 18b, or vice versa, the phase differential between the output of the two pumps 26 is reduced, which results in a reduction of noise within the braking system 10.

In traditional braking systems, the first braking circuit 18a and the second braking circuit 18b generally operate separately from one another, sharing only a common input, i.e. the master cylinder 11. However, in the system of the present invention, the first braking circuit 18a and second braking circuit 18b are interconnected with one another via the connecting conduit 40 and piston assembly 42. Therefore, in order to prevent catastrophic failure of the braking system 10 in the event of the individual failure of the first braking circuit 18a or second braking circuit 18b, a variety of safety features have been incorporated in the piston assembly 42 of the present invention. A first safety feature incorporated into the piston assembly 42 is a limitation of the resulting fluid displacement resulting from the maximum displacement of the piston 48 within the cylindrical housing 41. While it will be appreciated that the maximum displacement for the piston 48 may vary depending upon the braking system in which it is incorporated, the maximum fluid displacement for the floating piston 48 in a standard sized vehicle's automotive braking system 10 will typically approximate one cc. By limiting the maximum fluid displacement to one cc, both the first braking circuit 18a and the second braking circuit 18b can maintain operation in the event of failure (rupture) of the other braking circuit 18b or 18a. The maximum fluid displacement limitation is preferably based upon maintaining satisfactory operation of the operative brake circuit 18a or 18b in the event of such a failure. The diversion of one cc, or other suitable maximum fluid displacement, of fluid into the piston assembly 42 (due to low pressure in the operative brake circuit 18a or 18b and the resultant displacement of the piston 48 toward the lower pressure) will not sufficiently impact the remaining operative braking circuit 18a or 18b to prevent satisfactory braking circuit performance.

In conjunction with the limitation on the maximum fluid displacement of the floating piston 48, the vent opening 56 in the housing of the piston assembly 42 may also be provided as a means of failure management. The vent opening 56 operates to signal an alarm (not illustrated) in the event that fluid is received in the vent opening 56. The alarm may be a suitable audible signal or visual signal that alerts the operator of the vehicle of a disturbance within the braking system 10, or alternatively may be a computer failure code that could be read by a computer vehicle diagnosis device such as are becoming increasingly common in vehicle service stations. The presence of fluid in the vent opening 56 may occur during a failure of the sealing rings 54 disposed about the piston 48. In the event that the sealing ring 54 at either end 48a or 48b of the piston 48 fails or performance of the sealing ring 54 is compromised such that a limited volume of fluid flows past the sealing ring 54, the fluid from either the first braking circuit 18a or the second braking circuit 18b that flows beyond the corresponding sealing ring 54 will flow into the vent opening 56 and subsequently trigger the alarm. The piston assembly 42 will of course remain operable as long as one of the two sealing rings 54 continues to function. The alarm is just provided to allow the vehicle operator an opportunity to fix the first failed sealing ring 54 before both sealing rings 54 can fail, however unlikely this is to occur during the life of the vehicular braking system 10.

Another mode of operation for the braking system that necessitates applying brake pressure to individual wheel brakes 16 within the system 10 is Vehicle Stability Control (VSC). VSC systems use sensor inputs to calculate the driver's desired path and the vehicle's actual path and subsequently correct the vehicle's direction by automatically applying/releasing individual wheel brakes 16 where there is a difference between the desired and actual paths. The connecting conduit 40 and piston assembly 42 operate within a VSC system as described above with respect to traction control operations to apply wheel brake pressure to individual wheel brakes 16 within the braking system 10 during VSC operations.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A hydraulic braking system for a wheeled vehicle, comprising:
 a first braking circuit comprising a first wheel brake, a first source of pressurized fluid, and a first hydraulic conduit connecting said first wheel brake to said first source, said first hydraulic conduit connecting said first wheel brake and said first source having a first control valve disposed therein, said first control valve operating to selectively prevent fluid flow from said first source to said first wheel brake;
 a second braking circuit comprising a second wheel brake, a second source of pressurized fluid, and a second hydraulic conduit connecting said second wheel brake to said second source, said second hydraulic conduit connecting said second wheel brake and said second source having a second control valve disposed therein, said second control valve operating to selectively prevent fluid flow from said second source to said second wheel brake;
 a connecting conduit connecting said first braking circuit and said second braking circuit; and
 a piston assembly, including
 a floating piston disposed within said connecting conduit, said piston adapted to be displaced by the pressurized fluid provided by said first source when said first control valve is closed, the displacement of said piston generating an additional volume of pressurized fluid in said second hydraulic conduit in an amount to provide a substantially faster increase in the braking force of said second wheel brake;
 a cylindrical housing disposed within said connecting conduit, said cylindrical housing having a first end with a first seal disposed about the first end of said floating piston, said first end disposed to receive the pressurized fluid from said first source, and a second end with a second seal disposed about the second end of said floating piston, said second end disposed to receive the pressurized fluid from said second source, wherein said floating piston is disposed within said cylindrical housing, said floating piston having a first end disposed at the first end of said cylindrical housing and a second end disposed at the second end of said cylindrical housing, said floating piston being capable of reciprocal motion, wherein said floating piston is disposed between a first spring disposed at the first end of said cylindrical housing and a second spring disposed at the second end of said cylindrical housing; and
 a vent opening in said cylindrical housing located between the first end and the second end of said floating piston, wherein the displacement of the first seal of said floating piston during reciprocal motion is limited to the area between the first end and said vent opening, and wherein the displacement of the second seal of said floating piston during reciprocal motion is limited to the area between the second end and said vent opening.

2. A hydraulic braking system for a wheeled vehicle, comprising:
 a first braking circuit comprising a first wheel brake, a first source of pressurized fluid, and a first hydraulic conduit connecting said first wheel brake to said first source, said first hydraulic conduit connecting said first wheel brake and said first source having a first control valve disposed therein, said first control valve operating to selectively prevent fluid flow from said first source to said first wheel brake;

a second braking circuit comprising a second wheel brake, a second source of pressurized fluid, and a second hydraulic conduit connecting said second wheel brake to said second source, said second hydraulic conduit connecting said second wheel brake and said second source having a second control valve disposed therein, said second control valve operating to selectively prevent fluid flow from said second source to said second wheel brake;

a connecting conduit connecting said first braking circuit and said second braking circuit;

a floating piston disposed within said connecting conduit, said piston adapted to be displaced by the pressurized fluid provided by said first source when said first control valve is closed, the displacement of said piston generating an additional volume of pressurized fluid in said second hydraulic conduit in an amount to provide a substantially faster increase in the braking force of said second wheel brake; and a valve disposed in said connecting conduit between said first braking circuit and said floating piston for selectively preventing fluid flow in said connecting conduit.

3. A hydraulic braking system for a wheeled vehicle, comprising:

a plurality of wheel brakes capable of being operated individually;

at least a first source of pressurized fluid and a second source of pressurized fluid to supply pressurized fluid to respective ones of said wheel brakes;

a first hydraulic conduit to connect said first source of pressurized fluid to said wheel brakes controlled by said first source of pressurized fluid;

a control valve disposed within said first hydraulic conduit to selectively prevent fluid flow through said first hydraulic conduit;

a second hydraulic conduit to connect said second source of pressurized fluid to said wheel brakes controlled by said second source of pressurized fluid;

a connecting conduit connecting said first hydraulic conduit and said second hydraulic conduit;

a cylinder housing connected in line with said connecting conduit such that one end of said cylinder housing is in fluid communication with said first hydraulic conduit and a second end of said cylinder housing is connected in fluid communication with said second hydraulic conduit;

a floating piston disposed within said cylinder housing, said piston adapted to be displaced by the pressurized fluid provided by said first source when said control valve is closed, the displacement of said piston generating an additional volume of pressurized fluid in said second hydraulic conduit in an amount that provides a substantially faster increase in the braking force of the wheel brakes associated with said second source, said floating piston having a first end and a second end;

a first seal disposed about and fixed to the first end of said floating piston;

a second seal disposed about and fixed to the second end of said floating piston; and a vent opening defined in said cylindrical housing located between the first end and the second end of said floating piston, wherein the displacement of the first seal of said floating piston during reciprocal motion is limited to the area between the first end and said vent opening, and wherein the displacement of the second seal of said floating piston during reciprocal motion is limited to the area between the second end and said vent opening.

4. A hydraulic braking system for a wheeled vehicle, comprising:

a plurality of wheel brakes capable of being operated individually;

at least a first source of pressurized fluid and a second source of pressurized fluid to supply pressurized fluid to respective ones of said wheel brakes;

a first hydraulic conduit to connect said first source of pressurized fluid to said wheel brakes controlled by said first source of pressurized fluid;

a control valve disposed within said first hydraulic conduit to selectively prevent fluid flow through said first hydraulic conduit;

a second hydraulic conduit to connect said second source of pressurized fluid to said wheel brakes controlled by said second source of pressurized fluid;

a connecting conduit connecting said first hydraulic conduit and said second hydraulic conduit;

a floating piston disposed within said connecting conduit, said piston adapted to be displaced by the pressurized fluid provided by said first source when said control valve is closed, the displacement of said piston generating an additional volume of pressurized fluid in said second hydraulic conduit in an amount that provides a substantially faster increase in the braking force of the wheel brakes associated with said second source; and a valve disposed in said connecting conduit between said first braking circuit and said floating piston for selectively preventing fluid flow in said connecting conduit.

5. A hydraulic braking system for a wheeled vehicle, comprising:

a first wheel brake;

a second wheel brake;

a first source of pressurized fluid adapted to provide a braking force to said first wheel brake;

a second source of pressurized fluid adapted to provide a braking force to said second wheel brake;

a first hydraulic conduit connecting said first source to said first wheel brake;

a control valve disposed within said first hydraulic conduit to selectively prevent fluid flow through said first hydraulic conduit;

a second hydraulic conduit connecting said second source to said second wheel brake;

a connecting conduit connecting said first hydraulic conduit and said second hydraulic conduit; and a piston assembly comprising a floating piston disposed within said connecting conduit, said piston adapted to be displaced by the pressurized fluid provided by said first source when said control valve is closed, the displacement of said piston generating an additional volume of pressurized fluid in said second hydraulic conduit in an amount to provide a substantially faster increase in the braking force of said second wheel brake;

a cylindrical housing disposed within said connecting conduit, said cylindrical housing having a first end disposed to receive the pressurized fluid from said first source and a second end disposed to receive the pressurized fluid from said second source, wherein said floating piston is disposed within said cylindrical housing, said floating piston having a first end disposed at the first end of said cylindrical housing and a second end disposed at the second end of said cylindrical housing, said floating piston being capable of reciprocal motion, wherein said floating piston is disposed between a first spring disposed at the first end of said cylindrical housing and a second spring disposed at the second end of said cylindrical housing;

a first seal disposed about the first end of said floating piston;

a second seal disposed about the second end of said floating piston; and a vent opening defined in said cylindrical housing located between the first end and the second end of said floating piston, wherein the displacement of the first seal of said floating piston during reciprocal motion is limited to the area between the first end and said vent opening, and wherein the displacement of the second seal of said floating piston during reciprocal motion is limited to the area between the second end and said vent opening.

6. A hydraulic braking system for a wheeled vehicle, comprising:

a first wheel brake;

a second wheel brake;

a first source of pressurized fluid adapted to provide a braking force to said first wheel brake;

a second source of pressurized fluid adapted to provide a braking force to said second wheel brake;

a first hydraulic conduit connecting said first source to said first wheel brake;

a control valve disposed within said first hydraulic conduit to selectively prevent fluid flow through said first hydraulic conduit;

a second hydraulic conduit connecting said second source to said second wheel brake;

a connecting conduit connecting said first hydraulic conduit and said second hydraulic conduit;

a floating piston disposed within said connecting conduit, said piston adapted to be displaced by the pressurized fluid provided by said first source when said control valve is closed, the displacement of said piston generating an additional volume of pressurized fluid in said second hydraulic conduit in an amount to provide a substantially faster increase in the braking force of said second wheel brake; and a valve disposed between said first braking circuit and said floating piston for selectively preventing fluid flow in said connecting conduit.

7. A hydraulic braking system for a wheeled vehicle, comprising:

a first wheel brake;

a second wheel brake;

a first source of pressurized fluid to selectively supply pressurized fluid to said first wheel brake;

a second source of pressurized fluid to selectively supply pressurized fluid to said second wheel brake;

a first hydraulic conduit to connect said first source of pressurized fluid to said first wheel brake;

a second hydraulic conduit to connect said second source of pressurized fluid to said second wheel brake;

a connecting conduit connecting said first hydraulic conduit and said second hydraulic conduit;

a floating piston disposed within said connecting conduit;

a seal disposed about said piston and cooperating with said piston and said connecting conduit to prevent fluid communication between said first hydraulic conduit and said second hydraulic conduit through said connecting conduit;

a failure management system operable to detect a failure of said seal; and a valve disposed within said connecting conduit, said valve being selectively operable to prevent fluid flow through said connecting conduit.

* * * * *